United States Patent Office 3,093,689
Patented June 11, 1963

3,093,689
HYDROXY HALOGENATED ETHER
PRODUCTION
Kenneth B. Cofer, Pasadena, and Robert W. Fourie, Houston, Tex., assignors to Shell Oil Company, New York, N.Y., a corporation of Delaware
No Drawing. Filed July 8, 1960, Ser. No. 41,475
6 Claims. (Cl. 260—613)

This invention relates to the production of halo-substituted hydroxy ethers and especially to the manufacture of these compounds from unsaturated alcohols.

There are several routes whereby halo-substituted hydroxy ethers can be made using conventional chemical operations. For instance, an ether can be halogenated to introduce a plurality of halogen atoms per molecule and a part of these halogen atoms can be hydrolyzed to hydroxy groups by reacting with sodium hydroxide or the like. Alternatively a polyhydroxy ether can be reacted with dry hydrogen halide or with phosphorous pentahalide to partly replace the hydroxyl groups by halogen. Besides low yields, these methods have the disadvantage of usually producing mixed products since there is no way of controlling which of the halogens and hydroxyl groups will be converted in the different operations. On this account it is customary to rely upon reaction of an epihalohydrin with an alcohol for production of halogenated hydroxy ethers. The limited availability of low cost epihalohydrins seriously restricts the usefulness of this method and makes it prohibitively expensive in most cases where the starting epihalohydrin must be especially synthesized for the reaction.

An important object of the invention is the provision of a new and economically attractive method for the production of hydroxy halogenated ethers from unsaturated alcohols. Another object is the direct production in a single step, of halogenated hydroxy ethers from ethylenic alcohols. Still another object is to provide a new process whereby halo-substituted hydroxy ethers of predetermined fixed composition can be efficiently produced. A special object is the production of halogen-substituted hydroxy ethers which can be either symmetrical or unsymmetrical ethers depending upon the choice of the starting alcohol reactants. Further objects and advantages of the invention will be apparent from the following description of the new process.

In accordance with the invention halo-substituted hydroxy ethers are produced by reacting an ethylenic alcohol with a hypohalogenous acid. Ethers having halogen and hydroxy substituents on both groups attached to the ether oxygen atom are produced when the alcohol reactant is ehylenic alcohol exclusively. By adding a non-ethylenic alcohol to the reaction mixture an unsymmetrical halo-substituted hydroxy ether in which one of the groups attached to the ether oxygen is the same as that linked to the hydroxyl group of the non-ethylenic alcohol is produced by the new process. In both cases products may be obtained which are mixtures of isomeric ethers in which halogen is linked to one of the carbon atoms of the ethylenic group of a starting ethylenic alcohol and an ether oxygen is linked directly to the other carbon atom of that group in one ether and the halogen and ether oxygen linkages are reversed in their attachments to the carbon atoms of that ethylenic group in an isomeric ether product.

Production of halo-substituted hydroxy ethers in this way is readily carried out on a commercial scale in an efficient and economical manner. It was unexpected to find that this single step process will give these useful products. Instead halohydrination products of the starting ethylenic alcohol might have been predicted as the predominant product. A different mechanism of reaction is apparently responsible for the different type of product which is produced in high yield. These are halo-substituted hydroxy ethers of predetermined composition which are not only useful as solvents and as plasticizers for resins but also advantageous intermediates for the production of other desirable compounds, particularly epoxy ethers which are starting materials for resins and other products.

Any of the numerous ethylenic alcohols can be used in the new process. One especially preferred subgroup of starting alcohols are the water soluble beta,gamma-monoethylenic monohydric alcohols having three to five carbon atoms per molecule. Typical examples of alkenols of this kind are, allyl alcohol, methallyl alcohol, crotyl alcohol, methyl vinyl carbinol, dimethyl vinyl carbinol, 3-methyl-2-buten-1-ol, methyl isopropenyl carbinol, and the like. Examples of other suitable starting ethylenic alcohols are, for instance, 3-buten-1-ol; 3-penten-1-ol; 3-methyl-3-butene-1-ol; 2-methyl-3-butene-1-ol; methyl allyl carbinol; 4-methyl-4-penten-1-ol; 2,3-dimethyl crotyl alcohol; ethyl allyl carbinol; 1-heptene-4-ol; methyl ethyl allyl carbinol; dimethyl allyl carbinol; 2,4-dimethyl-1-hepten-4-ol; 1-decen-4-ol; 3,7-dimethyl-2-octen-1-ol; 10-undecen-1-ol; 11-dodecen-1-ol; oleyl alcohol, etc. Instead of the foregoing open chain aliphatic hydrocarbon alcohols, cyclo aliphatic hydrocarbon alcohols such as 2-cyclohexenol; 3-cyclohexenol; 2 - ethylidene - 1 - cyclohexanol; 3-cyclohexenyl methanol, and the like can be used. Another subgroup of suitable starting ethylenic alcohols are the aryl-substituted ethylenic alcohols and the alkenyl-substituted aromatic alcohols of which the following are representative examples, alpha-vinyl-benzyl alcohol; 1-phenyl-3-buten-2-ol; 2-phenyl-4-penten-2-ol; para-vinyl-benzyl alcohol and 3-phenyl-3-penten-2-ol.

Starting alcohols which contain more than one hydroxyl group and/or more than one ethylenic double bond in the molecule can be used in the new process although halo-substituted hydroxy ether mixtures of greater complexity will be obtained. Polyhydric ethylenic alcohols which can be employed are, for instance, 2-butene-1,4-diol; 1-butene - 3,4 - diol; 2-ethyl-1-phenyl-3-butene-1,2-diol; 5-vinyl-1,3-dimethanol benzene; 1,4-dihydroxycyclohexene-2; 1,2-dihydroxycyclohexene-3 and the like. Examples of polyethylenic alcohols which can be similarly used are, vinyl allyl carbinol; allyl propenyl carbinol; diallyl methyl carbinol; geraniol; linalool, 2,4-cyclohexadienylmethanol; divinylbenzyl alcohol; and 3,4-dihydroxy-1,5-hexadiene.

Substituted ethylenic alcohols can be employed as starting materials in the process of the invention instead of the foregoing alcohols which are seen to be alcohols of up to 18 carbon atoms per molecule containing only carbon, hydrogen and hydroxyl oxygen atoms. Halogen, ether, ketone, ester and like substituents which are unreactive under the conditions of the new reaction are the preferred type of substituents. Examples of such substituted ethylenic alcohols are, for instance, 1-chloro-3-buten-2-ol; 5 - chloro - 3 - methyl-2,4-hexadien-1-ol; 1-methoxy-2-propen-1-ol; 1-allyloxy-2-hydroxybutene-3; 3-hydroxy-4-cyclohexene-1-one; 1-acetoxybutene-2-ol-4 and the like.

When using ethylenic alcohols which have a solubility in water of less than about 25 percent by weight at ordinary temperature, it is advantageous to add to the reaction mixture a mutual solvent for the ethylenic alcohol and the hypohalogenous acid solution with which it is to be reacted. Sufficient of the mutual solvent should be used to make the concentration of the ethylenic alcohol in hypohalogenous acid solution at least equal to 50 percent by weight.

The hypohalogenous acid with which the ethylenic alcohol is reacted is preferably an aqueous solution of hypochlorous or hypobromous acid although hypofluorous or hypoiodous acids can also be used. The hypohalous acid can be made in the usual way by reacting the corresponding halogen with water. Instead of a preformed solution of the acid, the hypohalogenous acid can be formed in the reaction mixture during the process of the invention by feeding halogen and water to the reactor. Preferably a large molar excess of water to halogen, for example, about 5 to about 50 or more moles per mole of halogen, is used. Alcohol hypohalites, such, for example as ethyl hypochlorite, tertiary butyl hypochlorite, n-butyl hypobromite, and the like are another source of hypohalogenous acid for the reaction of the invention.

The hypohalogenous acid, whether preformed or made in situ is desirably used in an overall ratio of about one mole per mole of ethylenic alcohol to be reacted. Higher proportions of alcohol can be employed although usually at a sacrifice of plant capacity. Higher proportions of hypohalogenous acid, or of halogen when in situ hypohalogenous acid production is being used, to alcohol are feasible in the process but are less preferred because of the greater danger of by-product formation. An exception to this rule is in reactions with polyethylenic alcohols where higher ratios of hypohalogenous acid will be desirable when one wishes to obtain a halohydrinated product instead of a halo-hydroxyether containing one or more ethylenic groups. As a general rule mole ratios used will be in the range of about 0.5:1 to about 2:1, more preferably about 0.9:1 to about 1.1:1 when reacting monoethylenic alcohols.

The new reaction is carried out advantageously in the liquid phase, preferably at ordinary temperatures, but higher or lower temperature can also be used. Temperatures in the range of about 0° to about 100° C. are suitable. Atmospheric or elevated pressures can be used and either batch, continuous or intermittent method of reaction can be employed successfully.

The following examples illustrate in more detail, suitable methods for applying the process of the invention.

*Example I*

This example illustrates the production of di-(chlorohydroxypropyl) ethers by reacting allyl alcohol, chlorine and water.

One hundred and seventy grams of allyl alcohol, along with fifty grams of water, were charged to a one-liter reaction flask equipped with a stirrer, thermometer, reflux condenser, and chlorine-dispensing tube. The flask was immersed in a water bath for temperature control. Approximately 142 grams of chlorine were bubbled into the reaction flask over a two-hour reaction period. During the reaction the contents were rapidly stirred while the temperature was controlled between 0° C. and 25° C. by the addition of ice to the water batch.

After reaction the hydrochloric acid produced from the reaction of chlorine with water to form HOCl and HCl was neutralized with about 70 grams of NaOH dissolved in 200 cc. of water. During the neutralization the contents of the flask were kept at about 0° C. to prevent reaction of the chlorohydrin ethers with the NaOH. After neutralization, the water and excess allyl alcohol were distilled off under vacuum (200 mm. Hg). The product was then stabilized by heating to about 110° C. at 200 mm. Hg pressure for a period of 30 minutes. After stabilization the crude ether product was filtered to remove solid salt. The product was further purified by distilling off the dichlorohydrin and monochlorohydrin contaminants by stabilizing to a temperature of 110° C. at 10 mm. pressure. About 180 grams of product was obtained, which was identified as chlorohydrin ethers. The chief components of the product appear to be bis(2-chloro-3-hydroxypropyl) ether and its isomers 2-chloro-3-hydroxypropyl 3-chloro-2-hydroxypropyl ether, 2-chloro-3-hydroxypropyl 1-hydroxymethyl-2-chloroethyl ether and 3-chloro-2-hydroxypropyl 1-hydroxymethyl-2-chloroethyl ether.

In the same way when methallyl alcohol is reacted, an equally good yield of bis-(2-chloro-3-hydroxy-2-methylpropyl) ether and isomers is obtained and from crotyl alcohol and hypobromous acid bis(2-bromo-3-hydroxybutyl) ether and isomers are obtained.

By using methyl vinyl carbinol in place of the allyl alcohol of Example I, a good yield of bis(3-chloro-4-hydroxy-2-butyl) ether and isomers is realized. With either 2-methyl-2-buten-1-ol or methyl isopropenyl carbinol and hypobromous acid as the reactants the product is 3 - (2-bromo - 3 - hydroxy-2-methylbutoxy)-2-bromo-2-methylbutanol-1 and isomers in good yield.

When using 2-cyclohexenol as the ethylenic alcohol in the method of Example I the ether product is bis(2-chloro-3-hydroxycyclohexyl) ether and its isomers. In the same way, reaction of alpha-vinyl-benzyl alcohol gives bis(2-chloro-3-hydroxy-1-phenylpropyl) ether and isomers. With 2-butene-1,4-diol the product is 2(2-chloro-3,4-dihydroxy - 1 - butoxy) - 3 - chloro-1,4-butanediol and isomeric hydroxy-chloro ethers.

With a substantial molar excess of divinyl carbinol to hypochlorous acid at all times in the reaction one can obtain bis(1-vinyl-2-chloro-3-hydroxypropyl) ether and isomers in significant yield or by the use of larger amounts of hypochlorous acid, the chlorohydrination products of this unsaturated chlorohydroxy ether, particularly bis(2,4-dichloro-1,5-dihydroxy-3-amyl) ether and isomers can be obtained in substantial yield.

As previously pointed out, the reaction can be carried out having in the reaction mixture another alcohol or a phenol which takes part in the reaction as well as the ethylenic alcohol. In this modification of the invention the product will be an unsymmetrical ether in which one of the groups attached to the ether oxygen atom corresponds to the other alcohol or phenol minus a hydroxyl group while there is also linked to the ether oxygen atom a halo hydroxy radical derived from the ethylenic alcohol. This method of reaction can be carried out under the same conditions as used in reacting a single ethylenic alcohol or mixtures thereof with hypohalous acid as previously described. Lower alkanols are an example of one subgroup of saturated alcohols useful in this modification of the invention.

The ratio of ethylenic alcohol to other alcohol or phenol which can be used in this modification of the invention can be varied widely. Usually approximately equal mole ratios of the two different types of hydroxy compounds is advantageous. However, ratios of the order of about 0.1:1 to about 1.5:1 more preferably about 0.9:1 to about 1.1:1 moles of ethylenic alcohol to other hydroxyl compound, i.e. alcohol or phenol, are suitable.

The following examples illustrate this modification of the invention in more detail.

*Example II*

This example illustrates the production of 2-chloro-3-hydroxypropyl n-butyl ether and 2-butoxy-3-chloropropanol from n-butanol, allyl alcohol and hypochlorous acid.

Two hundred grams of normal butyl alcohol, along with 50 grams of water and 58 grams of allyl alcohol, were charged to a one-liter reaction flask equipped with a stirrer, thermometer, reflux condenser, and chlorine-dispensing tube. The flask was immersed in a water bath for temperature control. Approximately 71 grams of chlorine was bubbled into the reaction flask over a two-hour reaction period, during which time the contents were rapidly stirred and the temperature was controlled between 0° C. and 25° C. by the addition of ice to the water bath.

After reaction the hydrochloric acid produced during the reaction was neutralized with about 40 grams of NaOH dissolved in about 150 cc. of water. During the neutralization step, the contents of the reaction flask were kept at about 0° C. to prevent reaction of the chlorohydrin ethers with the NaOH. After neutralization the water and excess normal butyl alcohol were distilled off under vacuum. The product was then stabilized by heating to 110° C. at 200 mm. Hg pressure for about 30 minutes. After stabilization the product was filtered to remove the solid salt. Approximately 150 grams of light amber product was obtained, which was identified as chlorohydrin ether of normal butyl alcohol.

By substituting methallyl and ethyl alcohols for the allyl and butyl alcohols in the above process, a good yield of 3-ethoxy-2-chloro-2-methyl-1 propanol and its isomer 2-ethoxy-2-methyl-3-chloro-1-propanol is obtained. Using isopropyl alcohol with crotyl alcohol and hypobromous acid under the same conditions, the products are 3-isopropoxy-2-bromo-1-butanol and its isomer 2-isopropoxy-3-bromo-1-butanol.

Similar reaction of dimethyl vinyl carbinol with tert. butyl alcohol and HOCl formed in situ gives 4-chloro-3-tert. butoxy-2-methylbutanol-2 and 3-chloro-4-tert. butoxy-2-methylbutanol-2. With 3-butene-1-ol and n-propanol reacted with bromine and water, one obtains 3-bromo-4-propoxy-1-butanol and 4-bromo-3-propoxy-1-butanol.

1-cyclohexenylmethanol and methanol reacted with hypochlorous acid as in Example II results in the production of 1-chloro-1-hydroxymethyl-2-methoxy cyclohexane and 2-chloro-1-hydroxymethyl - 1 - methoxycyclohexane. Analogous reaction of 1-phenyl-3-buten-2-ol and ethanol yields 1-phenyl-3-chloro-4-ethoxybutanol-2 and 1-phenyl-4-chloro-3-ethoxybutanol-2. From 3-hexene-2,5-diol and isopropanol the chief product is 3-isopropoxy-4-bromohexane-2,5-diol when using hypobromous acid under the same conditions.

By substituting phenol for the n-butanol of Example II there can be produced 3-phenoxy-2-chloro-1-propanol and its isomer 2-phenoxy-3-chloro-1-propanol.

Use of a polyol for reaction with the ethylenic alcohol and hypohalous acid makes it possible to produce either mono- or polyethers as predominant product depending upon the proportions of the reactants which are employed. Thus reaction of allyl alcohol with ethylene glycol and hypochlorous acid according to the method of Example II gives 2-chloro-3-beta-hydroxyethyl-1-propanol with its isomer 3-chloro-2-beta-hydroxyethyl-1-propanol and 1,2-bis(2-chloro - 3 - hydroxypropyl(ethane and isomers. Using 2,2-bis(parahydroxyphenyl)propane, allyl alcohol and hypobromous acid in aqueous acetone solution, the chief products are 2-(parahydroxyphenyl)-2[4-(chloro-3-hydroxypropoxy) phenyl] propane and its isomer 2-(parahydroxyphenyl)-2[4-(1-hydroxymethyl-2 - chloroethoxy) phenyl] propane or 2,2-bis[4-(2-chloro-3-hydroxypropoxy)phenyl] propane and isomers depending on the proportions of the reactants employed.

Still other variations can be made in the process of the invention which is not limited to the reactions which have been given by way of illustration only nor by the examples which have been used to show suitable procedures for conducting these new reactions. Nor is the invention limited by any theory proposed in explanation of the new and improved results which are produced by the new method.

The halo-hydroxy ethers whose efficient production from ethylenic alcohols is made commercially feasible by the new process have a number of important uses. The liquid halo-hydroxy ethers are solvents for resins and the like and are useful in surface coating compositions. These and higher molecular halohydroxy ethers are convertible by reaction with sodium hydroxide or other base to epoxyethers which, especially in the case of the polyepoxy products, are starting materials for resinous products of various kinds. It will accordingly be seen that the new process of the invention offers many advantages and can be applied in many ways.

We claim as our invention:

1. A process for producing an unsymmetrical halo-substituted hydroxy ether which comprises reacting at about 0° to about 100° C. an ethylenic alcohol having up to 18 carbon atoms per molecule and a member of the group consisting of phenol and a lower alkanol with an aqueous hypohalogenous acid solution using a mole ratio of said acid to ethylenic alcohol of about 0.5:1 to about 2:1 and a mole ratio of ethylenic alcohol to said group member of about 0.1:1 to about 1.5:1, the concentration of the ethylene alcohol in the hypohalogenous acid solution as calculated without said group member being initially at least 50% by weight, and said alcohols containing only carbon, hydrogen and hydroxyl oxygen atoms whereby an unsymmetrical ether having attached to the ether oxygen atom (a) the radical corresponding to said group member minus OH, and (b) a halo hydroxy radical derived from the ethylenic alcohol is produced.

2. A process for producing an unsymmetrical halo-substituted hydroxy ether which comprises reacting at about 0° to about 100° C. an ethylenic alcohol having up to 18 carbon atoms per molecule and a lower alkanol with an aqueous hypohalogenous acid solution using a mole ratio of said acid to ethylenic alcohol of about 0.5:1 to about 2:1 and a mole ratio of ethylenic alcohol to saturated alcohol of about 0.1:1 to about 1.5:1, the concentration of the ethylenic alcohol in the hypohalogenous acid solution as calculated without the saturated alcohol being initially at least 50% by weight, and said alcohols containing only carbon, hydrogen and hydroxyl oxygen atoms whereby an unsymmetrical ether having attached to the ether oxygen atom (a) the radical corresponding to said saturated alcohol minus OH, and (b) a halo hydroxy radical derived from the ethylenic alcohol is produced.

3. A process in accordance with claim 2 wherein the unsymmetrical halo-substituted ether is recovered by neutralizing the reaction mixture at a temperature below that at which the ether reacts under the existing conditions and then distilling.

4. A process in accordance with claim 2 wherein an alkyl 2-chloro-3-hydroxyalkyl ether is produced by reacting a lower alkanol with a beta,gamma-ethylenic alkenol having 3 to 5 carbon atoms per molecule and hypochlorous acid.

5. A process in accordance with claim 4 wherein the alkenol is allyl alcohol and the hypochlorous acid is formed in the reaction mixture by reacting chlorine with water.

6. A process for producing a phenyl 2-chloro-3-hydroxyalkyl ether which comprises reacting at about 0° to about 100° C., phenol and a beta,gamma-ethylenic alkenol of 3 to 5 carbon atoms per molecule with aqueous hypochlorous acid solution using a mole ratio of said acid to ethylenic alcohol of about 0.5:1 to about 2:1 and a mole ratio of ethylenic alcohol to phenol of about 0.1:1 to about 1.5:1, the concentration of the ethylenic alcohol in the hypohalogenous acid solution, as calculated without the phenol, being initially at least 50% by weight whereby an ether having attached to the ether oxygen atom (a) the phenyl radical, and (b) a chloro hydroxy alkyl radical derived from the alkenol is produced.

References Cited in the file of this patent

Read et al.: Jour. Chem. Soc. (London), vol. 121 (1922), pages 989–999.

Taylor et al.: Canadian Jour. of Research, vol. 4 (1931), pages 119–133.

Williams et al.: Chem. and Met. Eng.; vol. 47 (1940), pages 834–838.